US006381096B1

(12) United States Patent
Collins

(10) Patent No.: US 6,381,096 B1
(45) Date of Patent: Apr. 30, 2002

(54) TAPE TRANSPORT WITH AIR BEARINGS

(75) Inventor: Gary W. Collins, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/452,712

(22) Filed: Dec. 2, 1999

(51) Int. Cl.$^7$ .............................................. G11B 15/64
(52) U.S. Cl. ............................... 360/130.21; 242/346.1
(58) Field of Search ................................. 360/221, 220, 360/90, 91, 92, 93, 94, 95, 96.3, 130.21, 130.2, 83, 84, 85, 96.1, 96.2, 96.4, 96.5, 96.6; 242/346.1, 615.4, 615.11, 555, 615.3, 419.6, 419.3; 72/379.2; 73/862.45; 156/64; 226/195

(56) References Cited

U.S. PATENT DOCUMENTS

| | | |
|---|---|---|
| 3,097,779 A | 7/1963 | Rock et al. |
| 3,347,437 A | 10/1967 | Rush |
| 3,391,399 A | 7/1968 | Pendleton |
| 3,715,521 A | 2/1973 | Licht |
| 3,890,641 A | 6/1975 | Mo et al. |
| 3,961,369 A * | 6/1976 | Baumann et al. ............. 360/84 |
| 3,981,024 A | 9/1976 | Mo et al. |
| 4,071,177 A | 1/1978 | Burdorf |
| 4,100,585 A | 7/1978 | Van Slageren |
| 4,142,661 A | 3/1979 | Nettles et al. |
| 4,145,796 A | 3/1979 | Mair |
| 4,315,287 A | 2/1982 | Noguchi |
| 4,425,809 A * | 1/1984 | van Bakel et al. ........ 73/862.48 |
| 4,474,320 A | 10/1984 | Rueger |
| 4,892,243 A | 1/1990 | Long et al. |
| 5,155,639 A * | 10/1992 | Platter et al. ................. 360/95 |
| 5,224,641 A | 7/1993 | Spicer |
| 5,299,756 A * | 4/1994 | Hu et al. ...................... 242/199 |
| 5,772,143 A | 6/1998 | Runyon et al. |
| 5,777,823 A | 7/1998 | Gavit |
| 5,870,924 A * | 2/1999 | Fahimi et al. .............. 72/379.2 |
| 5,913,991 A * | 6/1999 | Kubota et al. ................ 156/64 |
| 5,969,912 A * | 10/1999 | Cope ........................... 360/122 |

FOREIGN PATENT DOCUMENTS

| | | |
|---|---|---|
| DE | 24 59 803 A1 * | 10/1975 |
| JP | 53-118008 A * | 10/1978 |
| JP | 57-205847 A * | 12/1982 |

OTHER PUBLICATIONS

Air Bearing Tape Guide, Nov. 1984, IBM technical Bulletin vol. 27, No. 6, pp. 3634–3635.*

* cited by examiner

Primary Examiner—Brian E. Miller
Assistant Examiner—Chen Tienjie
(74) Attorney, Agent, or Firm—Brooks & Kushman P.C.

(57) ABSTRACT

A tape transport system for positioning magnetic tape moving over a tape head is provided. The tape system includes at least one air bearing having a sinuous surface over which travels one side of the tape and a mating sinuous surface over which travels the other side of the tape. The sinuous surfaces each have openings through which air is forced. As the tape passes through the bearing, the tape is stiffened, permitting the tape to be precisely guided over the tape head.

14 Claims, 4 Drawing Sheets

TAPE TRANSPORT WITH AIR BEARINGS

TECHNICAL FIELD

The present invention relates to guiding magnetic tape past a tape access head.

BACKGROUND ART

Magnetic tape is commonly used to store voice and data information due to its reliability, cost efficiency, and ease of use. One way in which magnetic tape may be made more useful and cost effective by increasing the density of information stored on the magnetic tape. One method of increasing information density is to decrease the thickness of the tape thereby permitting more tape to be stored in a given volume. Another way of improving magnetic tape storage is to increase the rate of information transfer. This may be accomplished by increasing the speed at which the tape passes the tape access head.

Decreasing the thickness or increasing the speed of magnetic tape creates difficulties in a tape transport system. In particular, guides used to align the tape with the tape head may cause curling, kinking, folding, and other mechanical damage because the tape lacks stiffness across the tape width.

What is needed is an effective tape transport system for thin tape. The tape transport system must be able to move magnetic tape past the tape head without stretching or mechanical damage. The tape should also be properly aligned with the tape head. The tape transport system should further be simple, inexpensive, and easy to maintain.

DISCLOSURE OF INVENTION

It is an object of the present invention to guide thin magnetic tape past a tape head.

It is another object of the present invention to position magnetic tape relative to the tape head.

It is still another object of the present invention to protect magnetic tape along the tape path.

It is yet another object of the present invention to reduce the complexity of the tape path.

In carrying out the above objects and other objects and features of the present invention, a tape transport system for positioning magnetic tape moving over a tape head is provided. The tape system includes at least one air bearing having a sinuous surface over which travels one side of the tape and a mating sinuous surface over which travels the other side of the tape. The sinuous surfaces each have openings through which air is forced. As the tape passes through the bearing, the tape is stiffened.

In an embodiment of the present invention, the mating sinuous surface is movable relative to the first sinuous surface. The mating sinuous surface may be moved away from the first sinuous surface during high speed tape movement or during tape threading.

In an another embodiment of the present invention, at least one of the sinuous surfaces has at least one edge for positioning the magnetic tape relative to the tape head. This may be a pair of edges forming a channel through which the magnetic tape is guided.

A method of transporting magnetic tape past the tape head is also provided. The tape is passed between at least two mating sinuous surfaces. Air is forced onto each side of the magnetic tape while the tape sides are between mating sinuous surfaces.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
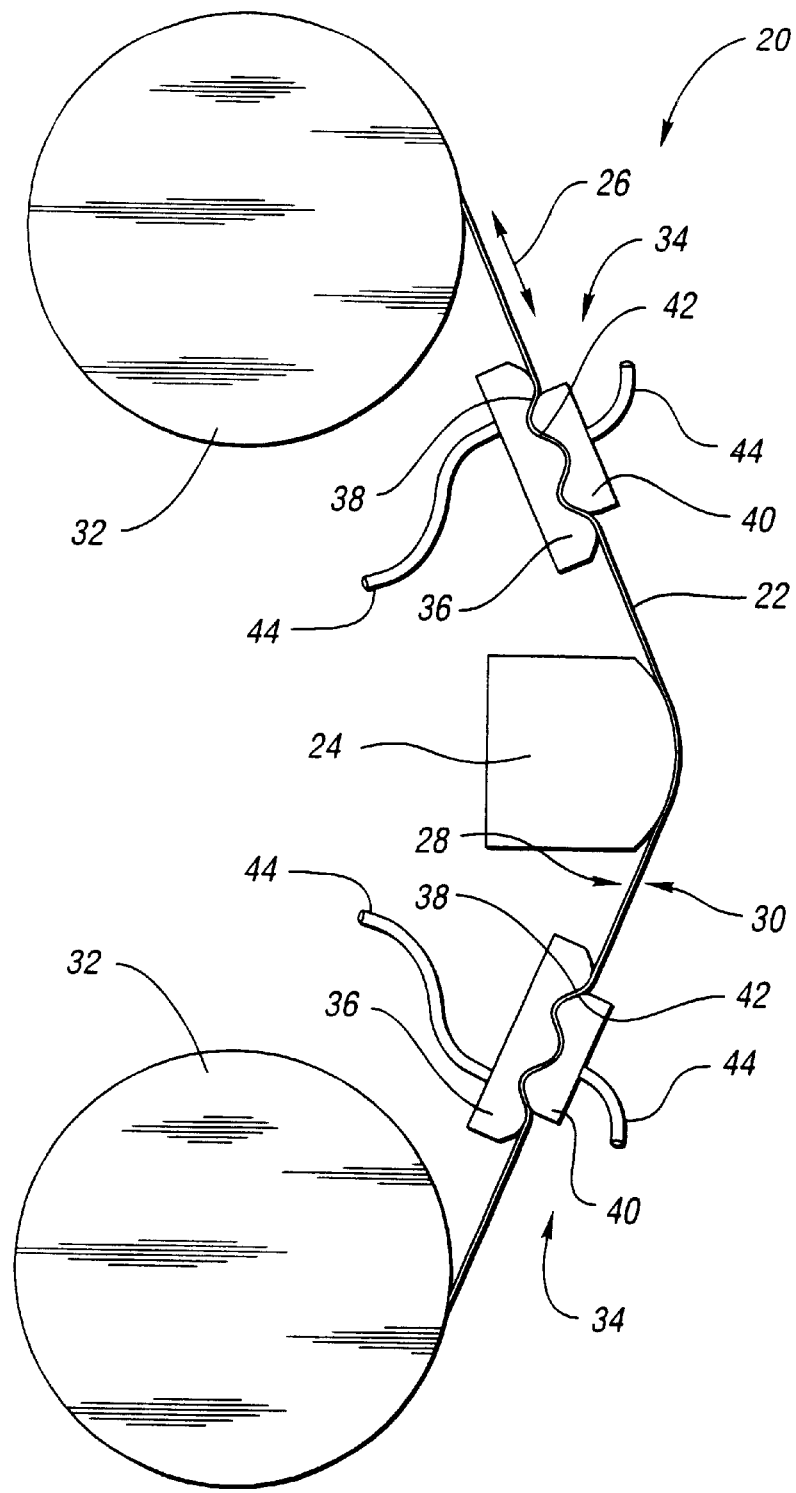
FIG. 1 is a schematic drawing of a tape transport system with two air bearings according to an embodiment of the present invention.

Referring to FIG. 1, a schematic drawing of a tape transport system with two air bearings according to an embodiment of the present invention is shown. A tape transport system, shown generally by 20, moves magnetic tape 22 past tape head 24 in either tape direction 26. Tape 22 has active side 28 onto which data can be written or from which data can be read by head 24. Opposite active side 28 is passive side 30. Tape 22 travels between two reels 32. Reels 32 may be contained within a tape cassette. Alternatively, one or both of reels 32 may be held within a tape cartridge. As will be recognized by one of ordinary skill in the art, the present invention will operate with a variety of means for holding tape 22. Tape 22 may be moved past tape head 24 by driving either or both of reels 32 or by any other means.

Tape transport system 20 also includes two air bearings, shown generally by 34. Each bearing 34 includes first section 36 with sinuous surface 38 facing tape active side 28 and second section 40 with mating sinuous surface 42 facing tape passive side 30. Air is supplied to sections 36, 40 through hoses 44 from an air supply, not shown. Each sinuous surface 38, 42 contains a plurality of openings through which air flows, cushioning tape 22. Hence, tape 22 follows the contours of sinuous surfaces 38, 40. Curving tape 22 stiffens tape 22 within an around bearing 34. Tape 22 is therefore less likely to be damaged by guides within or around bearing 34 used to position tape 22 relative to tape head 24.

Sinuous surfaces 38, 42 include alternating crests and troughs, roughly in the shape of a planar sinusoid. Many shapes are possible, including rounded triangular or rectangular peaks and valleys. Further, sinuous surfaces 38, 42 need not be planar.

Figure 2:
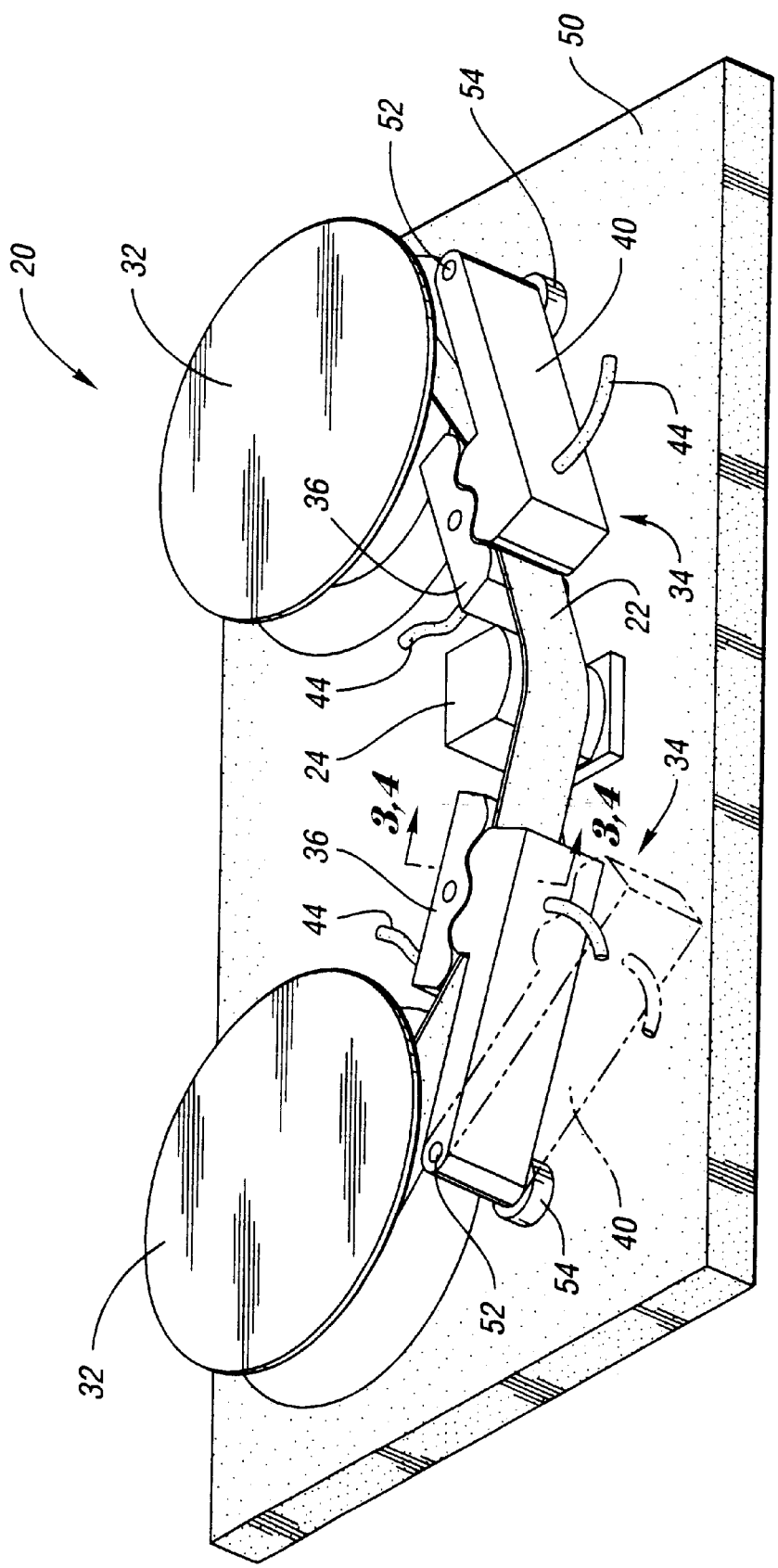
FIG. 2 is a detailed drawing of a tape transport system with separating air bearing sections according to an embodiment of the present invention.

Referring now to FIG. 2, a detailed drawing of a tape transport system with separating air bearing sections according to an embodiment of the present invention is shown. Each air bearing 34 has one section 36 rigidly attached to base 50. The other section 40 is attached to shaft 52 which runs through bearing 54 and base 50 to a drive mechanism not shown. This permits section 40 to rotate away from section 36. Separating sections 36, 40 simplifies the path traveled by tape 22 during high speed operations such as, for example, fast forward and rewind. Separating sections 36, 40 also permits threading of tape 22 through tape transport system 20. As will be recognized by one of ordinary skill in the art of tape transport system design, rotating section 40 away from section 36 is not the only means that may be used to separate sinuous surfaces 38, 42. For example, either or both of sections 36, 40 may translate along base 50 or may drop into base 50.

Figure 3A:
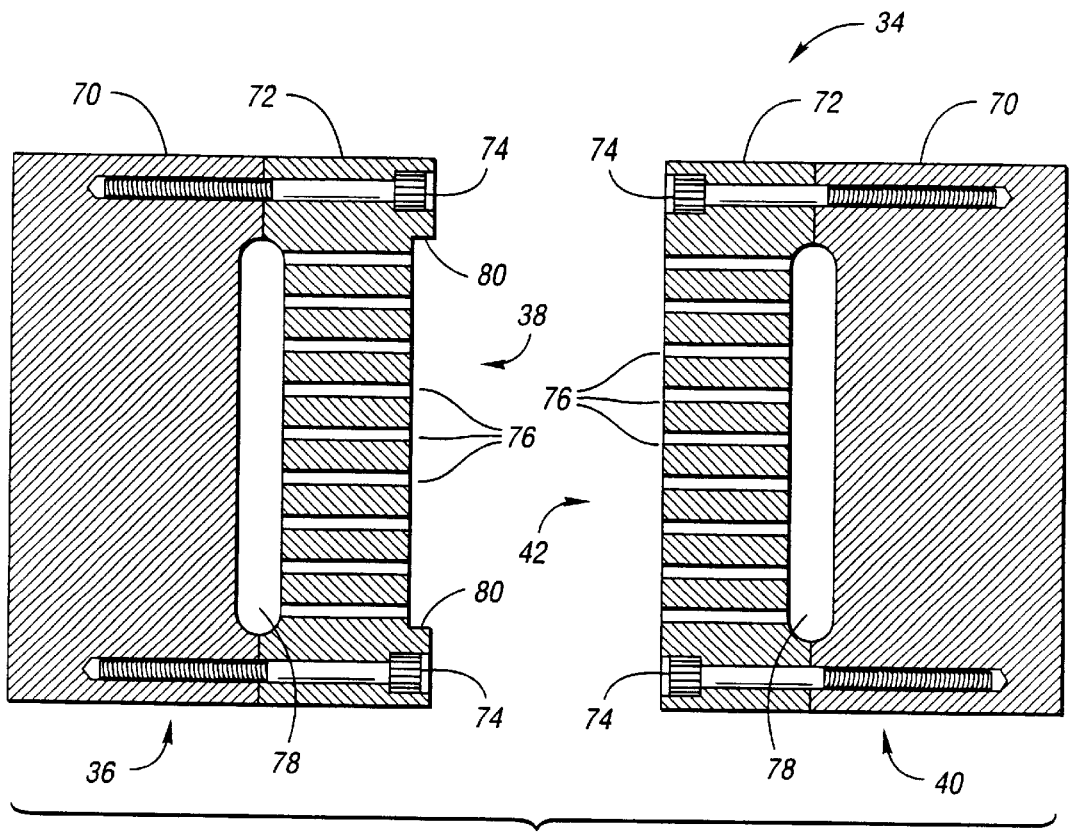
FIGS. 3a and 3b are sectional drawings of an air bearing with guide edges on one section.
Figure 3B:
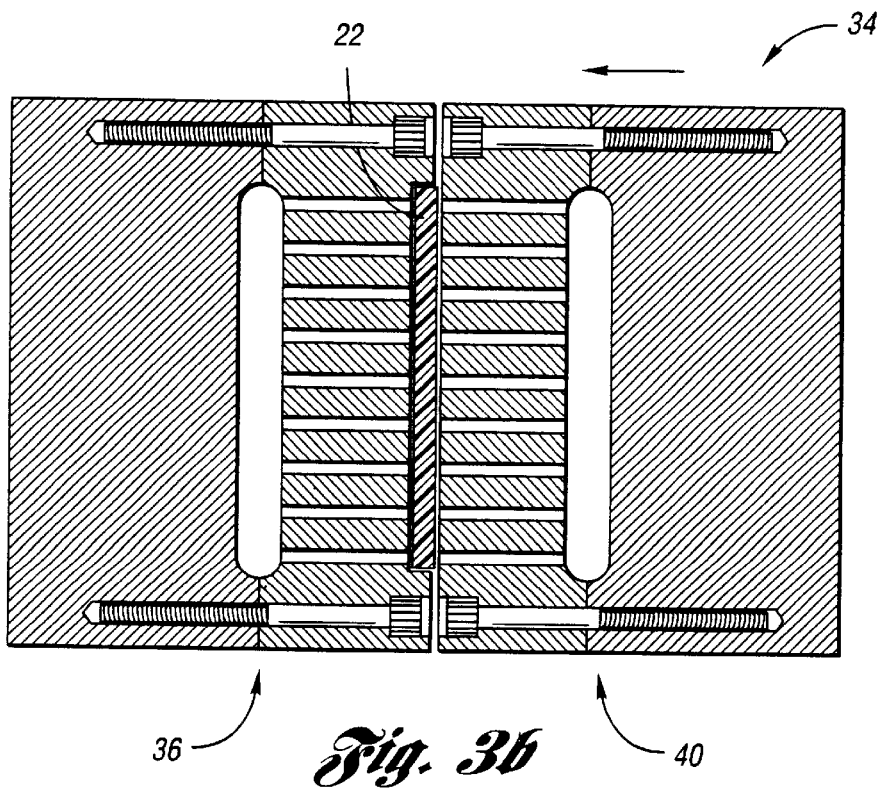

Referring now to FIGS. 3a and 3b, sectional drawings of an air bearing with guide edges on one section are shown. Each section 36, 40 includes backing member 70 attached to surface member 72 using bolts 74. Each surface member 72 is formed to have a sinuous surface 38, 42 including a plurality of openings such as holes, some of which are indicated by 76. Holes 76 pass through surface member 72 into manifold 78. Air from hose 44 passes through manifold 78, through holes 76, and onto tape 22. Surface member 72 in section 36 includes two edges 80. As shown in FIG. 3b, edges 80 form a channel through which passes tape 22. Placing both edges 80 on one section 36 is advantageous if section 36 is fixed relative to tape head 24. Movable section 40, therefore, need not be precisely aligned with tape head 24.

Backing member 70 and surface member 72 may be made from a variety of engineering materials including metals and polymers. Openings in sinuous surface 38, 42 on surface member 72, such as holes 76, may be drilled or bored or may be cast or molded into surface member 72. Surface member 72 may also be constructed of a porous material.

Figure 4:
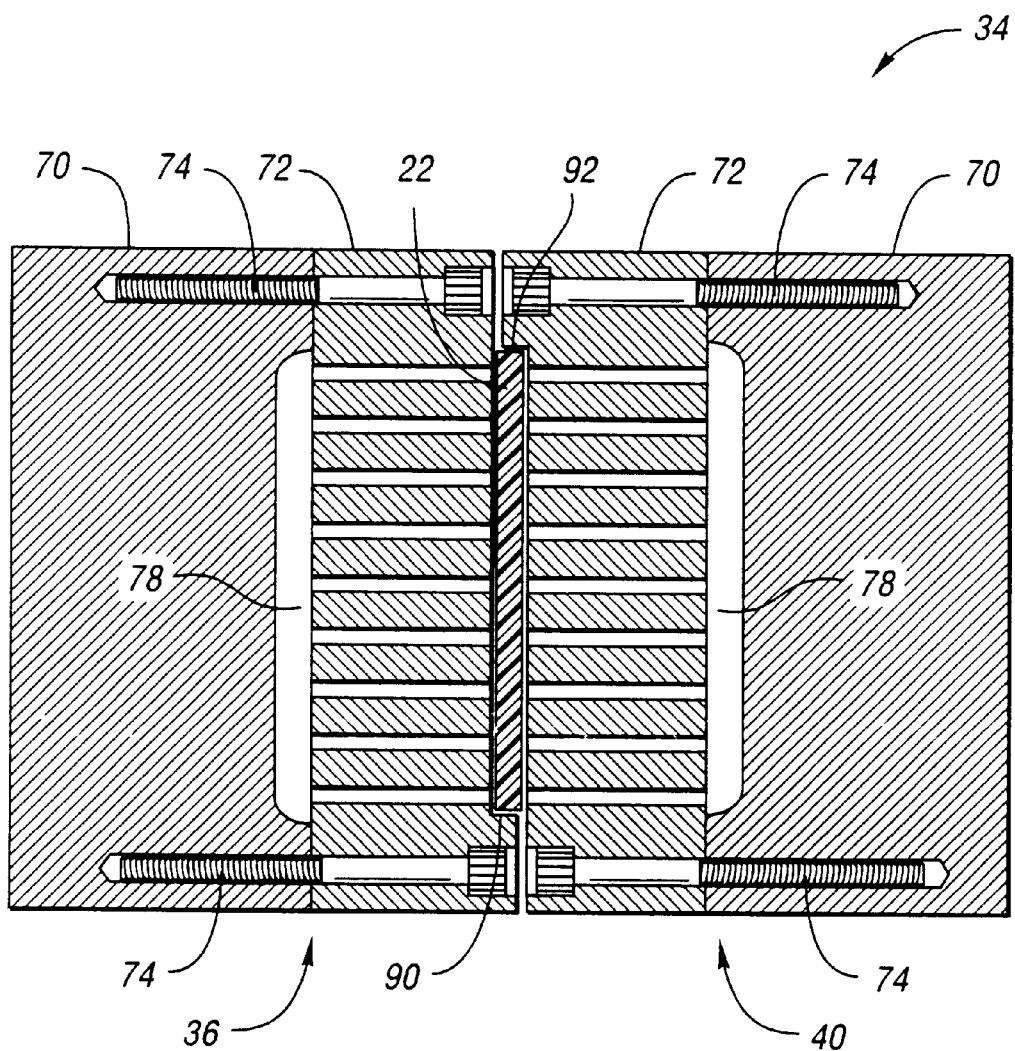
FIG. 4 is a sectional drawing of an air bearing with a guide edge on each section.

Referring now to FIG. 4, a sectional drawing of an air bearing with a guide edge on each section is shown. In this embodiment, edge 90 is located on surface element 72 of section 36. Edge 92 is located on surface element 72 of section 40. Locating one edge on each section 36, 40 is advantageous if each section 36, 40 moves relative to tape head 24 or if locating both edges on section 36 is too constraining during high speed operations.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A tape transport system for positioning magnetic tape moving in a tape direction past a tape heads the magnetic tape having a first side and a second side, at least one of the first side and the second side comprising a surface onto which information may be written and from which information can be read, the tape transport system comprising:
   at least one air bearing in front of the tape bead in the tape direction, each air bearing comprising a first sinuous surface over which travels the tape first side and a mating sinuous surface over which travels the tape second side, the first sinuous Surface and the mating sinuous surface comprising a plurality of openings through which air is food; and
   a base onto which the first sinuous surface is fixedly mounted and onto which the mating sinuous surface is movably mounted.

2. A tape transport system as in claim 1 wherein the mating sinuous surface is moved away from the first sinuous surface during high speed tape movement.

3. A tape transport system as in claim 1 wherein the mating sinuous surface is moved away from the first sinuous surface during magnetic tape threading.

4. A tape transport system as in claim 1 wherein at least one of the sinuous surfaces comprises at least one edge for positioning the magnetic tape relative to the tape head.

5. A tape transport method as in claim 4 wherein the at least one edge is a pair of edges, the pair of edges forming a channel through which the magnetic tape is guided.

6. A method of transporting magnetic tape in a tape direction past a tape head, the magnetic tape having a first side and a second side, at least one of the fist side and the second side comprising a surface onto which information may be written and from which information can be read, the method comprising:
   passing the magnetic tape between at least two mating sinuous surfaces;
   forcing air onto each side of the magnetic tape while the magnetic tape is between mating sinuous surfaces; and
   separating the at least two mating sinuous surfaces when the magnetic tape 18 not being written to or read from.

7. A method of transporting magnetic tape as in claim 6 further comprising separating the two sinuous surfaces during high speed tape movement.

8. A method of transporting magnetic tape as in claim 6 further comprising separating the two sinuous surfaces during magnetic tape threading.

9. A method of transporting magnetic tape as in claim 6 further comprising positioning the magnetic tape relative to the tape head while the magnetic tape is between the two mating sinuous surfaces.

10. An air bearing for stiffening a thin magnetic tape, the air bearing being a part of a tape transport system for positioning tape moving in a tape direction over a tape head, the air bearing comprising:
    a first section having a first sinuous surface across which the magnetic tape travels, the first surface comprising a plurality of alternating crests and troughs, each crest and each trough substantially perpendicular to the tape direction and extending across the tape width, the first surface further defining a plurality of openings through which air may pass, the air providing a cushion between the first surface and the magnetic tape as the magnetic tape passes over the first surface; and
    a second section having a second sinuous surface across which the magnetic tape travels, the second surface comprising a plurality of crests and troughs mating with troughs and crests on the first surface, the second surface further defining a plurality of openings through which air may pass, the air providing a cushion between the second surface and the magnetic tape as the magnetic tape passes over the second surface;
    wherein magnetic tape passing between the first surface and the second surface develops curved edges, the curved edges stiffening the magnetic tape.

11. An air bearing as in claim 10 wherein the first section and the second section are movably separable to permit high speed tape movement.

12. An air bearing as in claim 10 wherein the first section and the second section are movably separable to permit magnetic tape threading.

13. An air bearing as in claim 10 wherein at least one of the first surface and the second surface comprises at least one edge for guiding the magnetic tape.

14. An air bearing as in claim 13 wherein the at least one edge is a pair of edges, the pair of edges forming a channel through which passes the magnetic tape.

* * * * *